(12) United States Patent
Wiebrock et al.

(10) Patent No.: US 8,092,171 B2
(45) Date of Patent: Jan. 10, 2012

(54) SYSTEMS AND METHODS FOR ASSEMBLING A PITCH ASSEMBLY FOR USE IN A WIND TURBINE

(75) Inventors: Dieter Hermann Benno Wiebrock, Georgsmarienhuette (DE); Matthias Alfons Volmer, Salzbergen (DE)

(73) Assignee: General Electric Company, Schenectady, NY (US)

( * ) Notice: Subject to any disclaimer, the term of this patent is extended or adjusted under 35 U.S.C. 154(b) by 65 days.

(21) Appl. No.: 12/570,864

(22) Filed: Sep. 30, 2009

(65) Prior Publication Data

US 2010/0135808 A1    Jun. 3, 2010

(51) Int. Cl.
*F01D 7/00* (2006.01)
(52) U.S. Cl. .......................... 416/1; 416/155; 416/210 R
(58) Field of Classification Search .............. 416/244 R, 416/244 A, 245 R, 155, 156, 1, 210 R; 290/44, 290/55
See application file for complete search history.

(56) References Cited

U.S. PATENT DOCUMENTS

| | | | |
|---|---|---|---|
| 2,645,294 A * | 7/1953 | Douthett | 416/51 |
| 6,783,326 B2 * | 8/2004 | Weitkamp et al. | 416/1 |
| 6,939,103 B2 | 9/2005 | Wobben | |
| 7,004,724 B2 * | 2/2006 | Pierce et al. | 416/61 |
| 7,261,517 B2 * | 8/2007 | Uphues et al. | 416/153 |
| 7,322,794 B2 * | 1/2008 | LeMieux et al. | 416/40 |
| 7,331,761 B2 * | 2/2008 | Hansen et al. | 416/11 |
| 7,470,111 B2 * | 12/2008 | Schubert | 416/155 |
| 7,780,417 B2 * | 8/2010 | Kirchner et al. | 416/207 |
| 7,866,946 B2 * | 1/2011 | Nitzpon | 416/1 |
| 2005/0254949 A1 * | 11/2005 | Schubert | 416/170 R |
| 2006/0001268 A1 * | 1/2006 | Moroz | 290/44 |
| 2006/0083615 A1 * | 4/2006 | Rogall et al. | 416/98 |
| 2008/0069693 A1 * | 3/2008 | Malakhova et al. | 416/61 |
| 2008/0191488 A1 * | 8/2008 | Kirchner et al. | 290/55 |
| 2008/0309091 A1 * | 12/2008 | Hahlbeck | 290/55 |
| 2009/0016885 A1 | 1/2009 | Bech | |
| 2009/0048051 A1 | 2/2009 | Koleoglou | |
| 2009/0218818 A1 * | 9/2009 | Cardinal et al. | 290/44 |

FOREIGN PATENT DOCUMENTS

| | | |
|---|---|---|
| EP | 1337755 A1 | 8/2005 |
| EP | 1764544 A2 | 3/2007 |
| EP | 1788238 A2 | 5/2007 |
| JP | 6200864 A | 7/1994 |
| JP | 2009008095 A | 1/2009 |
| WO | 2008074320 A1 | 6/2008 |

* cited by examiner

*Primary Examiner* — Edward Look
*Assistant Examiner* — Aaron R Eastman
(74) *Attorney, Agent, or Firm* — James McGinness, Esq.; Armstrong Teasdale LLP (57) ABSTRACT

A method of assembling a wind turbine. The method includes coupling a pitch bearing to a hub that includes a wall. The pitch bearing includes a plurality of sets of pitch bearing teeth. At least one blade is coupled to the pitch bearing such that the blade is rotatable about a pitch axis. A plurality of pitch gearbox brackets are coupled to the hub wall. A pitch drive system is selectively coupled to one of the plurality of pitch gearbox brackets, wherein a predetermined set of pitch bearing teeth are in contact with the pitch drive system.

20 Claims, 5 Drawing Sheets

SYSTEMS AND METHODS FOR ASSEMBLING A PITCH ASSEMBLY FOR USE IN A WIND TURBINE

BACKGROUND OF THE INVENTION

The embodiments described herein relate generally to methods and systems for assembling a wind turbine including a pitch drive system, and more particularly, to systems and methods for assembling a pitch assembly for use in wind turbines.

At least some known wind turbines include a bearing coupled between a blade and a hub, and a pitch assembly for use in positioning the blade attached to the bearing. The pitch assembly is operated to adjust the pitch of the blade. Over time, the pitch bearing teeth of the bearing may become worn. As the pitch bearing teeth become worn, the pitch assembly becomes less effective in operating to adjust the pitch of the blades. In some cases, the pitch bearing teeth can fail resulting in the inability of the pitch drive system to rotate the blade. In at least some known wind turbines, the entire hub must be removed from the wind turbine, prior to removing each blade and adjusting the pitch bearing to engage new pitch bearing teeth. In some wind turbines, the blades are between 60 and 100 meters in length, and as such, replacing worn pitch bearing teeth can be costly and time-consuming.

During operation worn pitch bearing teeth may enable a blade to undesirably move from a desired pitch setting. In some cases, the blades of the wind turbine asymmetrically load the hub and rotor shaft, and may cause the rotor to become imbalanced. Depending on the extent of the rotor imbalances, increased loads may be induced to the rotor and other drive train components. Moreover, the rotor's position with respect to the wind may induce increased loads on the rotor and other drive train components.

BRIEF DESCRIPTION OF THE INVENTION

In one aspect, a method of assembling a wind turbine is provided. The method includes coupling a pitch bearing to a hub that includes a wall. The pitch bearing includes a plurality of sets of pitch bearing teeth. At least one blade is coupled to the pitch bearing such that the blade is rotatable about a pitch axis. A plurality of pitch gearbox brackets are coupled to the hub wall. A pitch drive system is selectively coupled to one of the plurality of pitch gearbox brackets, wherein a predetermined set of pitch bearing teeth are in contact with the pitch drive system.

In another aspect, a pitch assembly for use in a wind turbine is provided. The pitch assembly includes a pitch bearing rotatably coupled to a hub. The pitch bearing includes a plurality of sets of pitch bearing teeth. A plurality of pitch gearbox brackets are coupled to a wall of the hub. A pitch drive system is coupled to one of the plurality of pitch gearbox brackets to selectively contact a predetermined set of pitch bearing teeth.

In still another aspect, a wind turbine system is provided. The wind turbine system includes a hub that includes a wall and a pitch bearing rotatably coupled to the hub, wherein the pitch bearing includes a plurality of sets of pitch bearing teeth. At least one rotor blade is coupled to the pitch bearing. A plurality of pitch gearbox brackets are coupled to the hub wall. A pitch drive system is coupled to one of the plurality of pitch gearbox brackets to selectively contact a predetermined set of pitch bearing teeth.

The embodiments described herein facilitate adjusting the pitch assembly without requiring the hub and/or rotor blade to be removed from the wind turbine. More specifically, the pitch assembly described herein enables a pitch drive system to be selectively positioned within the pitch bearing, such that the pitch drive system can selectively contact a predetermined set of pitch bearing teeth without removing the hub and/or rotor blade from the wind turbine.

BRIEF DESCRIPTION OF THE DRAWINGS

FIGS. 1-5 illustrate exemplary embodiments of the systems and methods described herein.

DETAILED DESCRIPTION OF THE INVENTION

The embodiments described herein include a wind turbine system that enables the maintenance of the pitch bearing assembly without requiring the rotor and hub of the wind turbine to be removed. The systems and methods described herein facilitate maintenance of the pitch drive system without removing the rotor blade from the wind turbine.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

Figure 1:
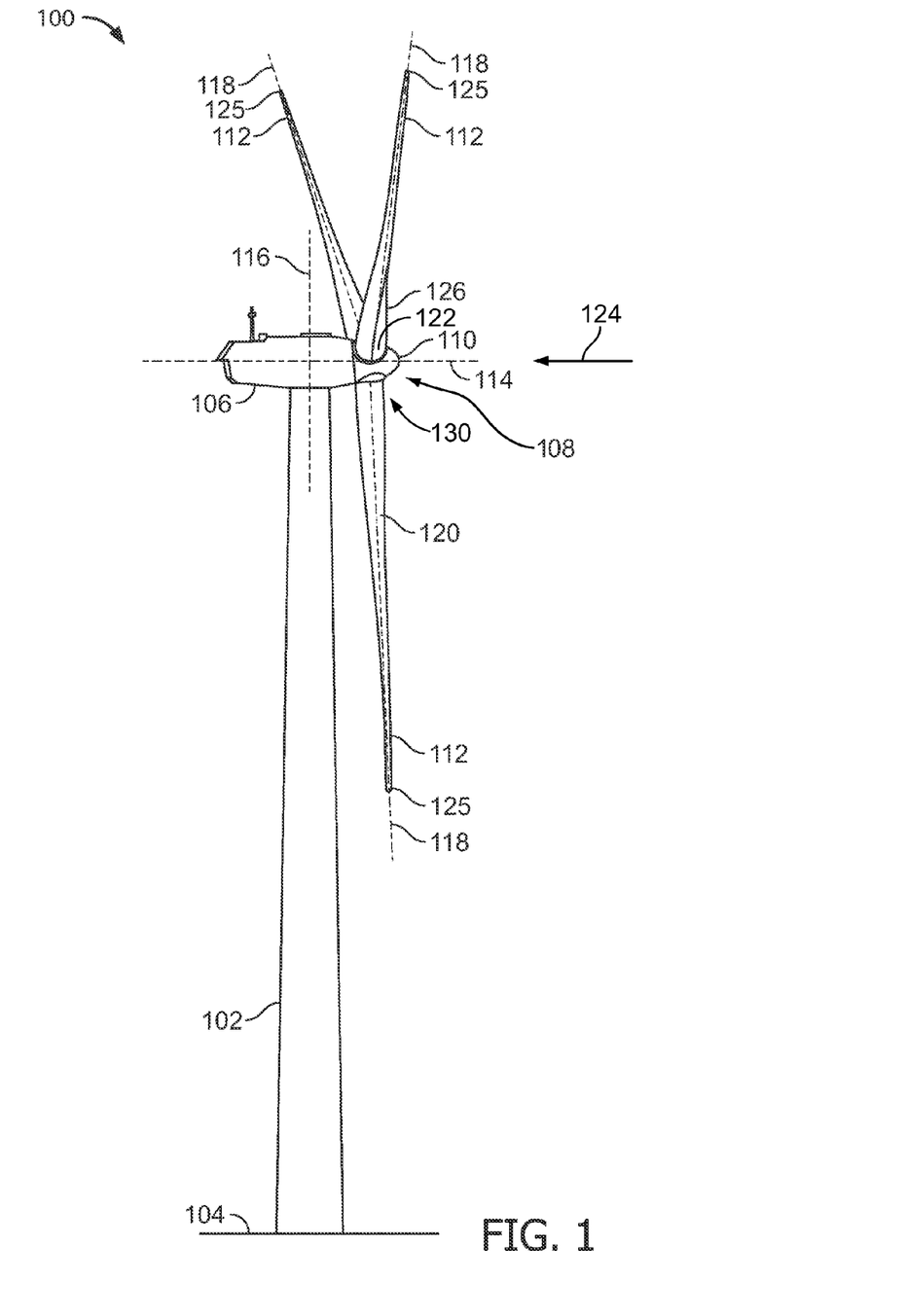
FIG. 1 is a schematic view of an exemplary wind turbine generator.

FIG. 1 is a schematic view of an exemplary wind turbine generator 100. In the exemplary embodiment, wind turbine generator 100 is a horizontal-axis wind turbine. Alternatively, wind turbine generator 100 is a vertical-axis wind turbine. In the exemplary embodiment, wind turbine generator 100 includes a tower 102 extending from and coupled to a supporting surface 104. Tower 102 is coupled to surface 104 by either anchor bolts or by a foundation mounting piece (neither shown). A nacelle 106 is coupled to tower 102, and a rotor 108 is coupled to nacelle 106. Rotor 108 includes a rotatable hub 110 and a plurality of rotor blades 112 coupled to hub 110. In the exemplary embodiment, rotor 108 includes three rotor blades 112. Alternatively, rotor 108 may have any number of rotor blades 112 that enables wind turbine generator 100 to function as described herein. Tower 102 is any suitable height or construction that enables wind turbine generator 100 to function as described herein.

Rotor blades 112 are spaced about rotor hub 110 to facilitate rotating rotor 108, thereby transferring kinetic energy from wind 124 into usable mechanical energy, and subsequently, electrical energy. Rotor 108 and nacelle 106 are rotated about tower 102 on a yaw axis 116 to control the perspective of rotor blades 112 with respect to the direction of wind 124. Rotor blades 112 are mated to hub 110 by coupling a blade root portion 120 to hub 110 at a plurality of load transfer regions 122. Load transfer regions 122 each have a hub load transfer region and a blade load transfer region (both not shown in FIG. 1). Loads induced to rotor blades 112 are transferred to hub 110 by load transfer regions 122. Each rotor blade 112 also includes a blade tip portion 125.

In the exemplary embodiment, rotor blades 112 have a length of between 30 meters (m) (98 feet (ft)) and 50 m (164 ft). Alternatively, rotor blades 112 may have any length that enables wind turbine generator to function as described herein. As wind 124 contacts each rotor blade 112, blade lift forces are induced to each rotor blade 112 and rotation of rotor 108 about an axis of rotation 114 is induced as blade tip portions 125 are accelerated.

A pitch angle (not shown) of rotor blades 112, i.e., an angle that determines a perspective of each rotor blade 112 with respect to a direction of wind 124, may be changed by a pitch assembly 130. Specifically, increasing a pitch angle of rotor blade 112 decreases an amount of blade surface area 126 exposed to wind 124 and, conversely, decreasing a pitch angle of rotor blade 112 increases an amount of blade surface area 126 exposed to wind 124. The pitch angles of rotor blades 112 are adjusted about a pitch axis 118 for each rotor blade 112. In the exemplary embodiment, the pitch angles of rotor blades 112 are controlled individually. Alternatively, the pitch of rotor blades 112 may be controlled as a group.

Figure 2:
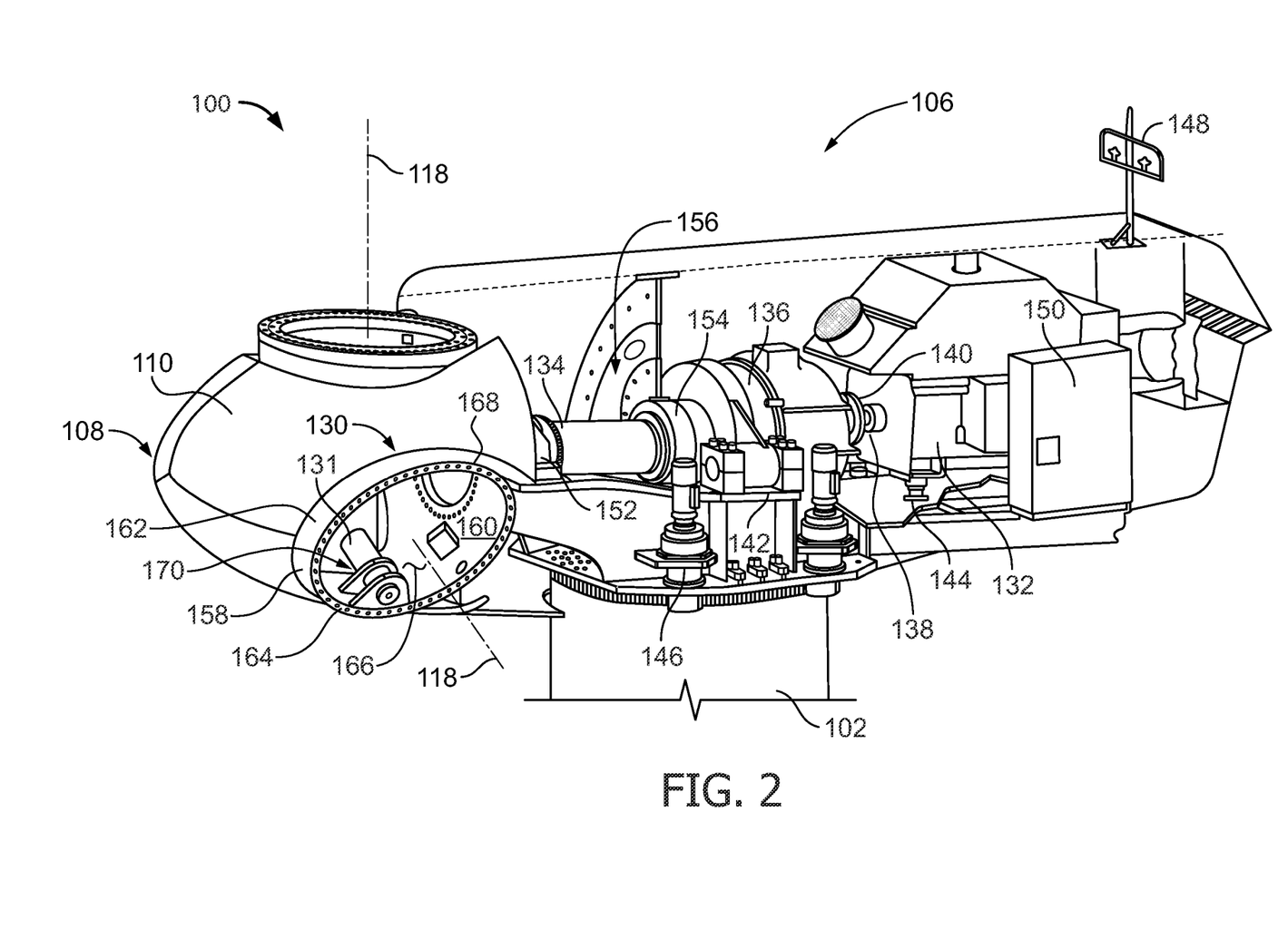
FIG. 2 is a cross-sectional schematic view of an exemplary nacelle suitable for use with the wind turbine generator shown in FIG. 1.

FIG. 2 is a cross-sectional schematic view of nacelle 106 of exemplary wind turbine generator 100. Various components of wind turbine generator 100 are housed in wind turbine nacelle 106. In the exemplary embodiment, nacelle 106 includes three pitch assemblies 130 that are each coupled to a respective rotor blade 112 (shown in FIG. 1), wherein pitch assembly 130 modulates the pitch of associated rotor blade 112 along pitch axis 118. Only one of three pitch assemblies 130 is illustrated in FIG. 2.

In the exemplary embodiment, each pitch assembly 130 includes at least one pitch drive motor 131. Pitch drive motor 131 is any motor driven by electrical power and/or a hydraulic system that enables pitch assembly 130 to function as described herein. Alternatively, pitch assembly 130 may include any suitable structure, configuration, arrangement, and/or components such as, but not limited to, hydraulic cylinders, springs, and/or servo-mechanisms. Moreover, pitch assembly 130 may be driven by any suitable means such as, but not limited to, hydraulic fluid, and/or mechanical power, such as, but not limited to, induced spring forces and/or electromagnetic forces.

Nacelle 106 also includes a rotor 108 that is rotatably coupled to an electric generator 132 positioned within nacelle 106 by rotor shaft 134 (sometimes referred to as either a main shaft or a low speed shaft), a gearbox 136, a high speed shaft 138, and a coupling 140. Rotation of rotor shaft 134 rotatably drives gearbox 136 that subsequently drives high speed shaft 138. High speed shaft 138 rotatably drives generator 132 with coupling 140 and rotation of high speed shaft 138 facilitates production of electrical power by generator 132. Gearbox 136 and generator 132 are supported by supports 142 and 144, respectively. In the exemplary embodiment, gearbox 136 utilizes a dual path geometry to drive high speed shaft 138. Alternatively, rotor shaft 134 is coupled directly to generator 132 with coupling 140.

Nacelle 106 also includes a yaw drive mechanism 146 that may be used to rotate nacelle 106 and rotor 108 on yaw axis 116 (shown in FIG. 1) to control the perspective of rotor blades 112 with respect to the direction of wind 124. Nacelle 106 also includes at least one meteorological mast 148 that includes a wind vane and anemometer (neither shown in FIG. 2). Mast 148 provides information to a turbine control system 150 that may include wind direction and/or wind speed. Pitch assembly 130 is coupled to control system 150 for control thereby. In the exemplary embodiment, nacelle 106 also includes main, or forward and aft, support bearings 152 and 154, respectively.

Support bearings 152 and 154 facilitate radial support and alignment of rotor shaft 134. Forward support bearing 152 is coupled to rotor shaft 134 near hub 110. Aft support bearing 154 is positioned on rotor shaft 134 near gearbox 136 and/or generator 132. Alternatively, nacelle 106 includes any number of support bearings that enable wind turbine generator 100 to function as disclosed herein. Rotor shaft 134, generator 132, gearbox 136, high speed shaft 138, coupling 140, and any associated fastening, support, and/or securing device including, but not limited to, supports 142 and 144, and support bearings 152 and 154, are sometimes referred to as a drive train 156.

Hub 110 includes an outer wall 158 that includes an inner surface 160, an outer surface 162, and a bearing surface 164. Inner surface 160 defines a hub cavity 166. Pitch assembly 130 further includes a pitch bearing 168 and a plurality of pitch gearbox brackets 170 for positioning pitch motor 131 adjacent to pitch bearing 168. Pitch bearing 168 is coupled to hub outer wall 158 and to rotor blade 112 (shown in FIG. 1), for rotating rotor blade 112 about pitch axis 118. Specifically pitch bearing 168 is coupled to hub outer wall 158 such that pitch bearing 168 is positioned adjacent to bearing surface 164. In the exemplary embodiment, pitch gearbox brackets 170 are coupled to hub inner surface 160 such that pitch motor 131 is positioned within hub cavity 166. In an alternative embodiment, pitch gearbox brackets 170 are coupled to hub outer surface 162, such that pitch motor 131 is positioned outside hub 110.

Figure 3:
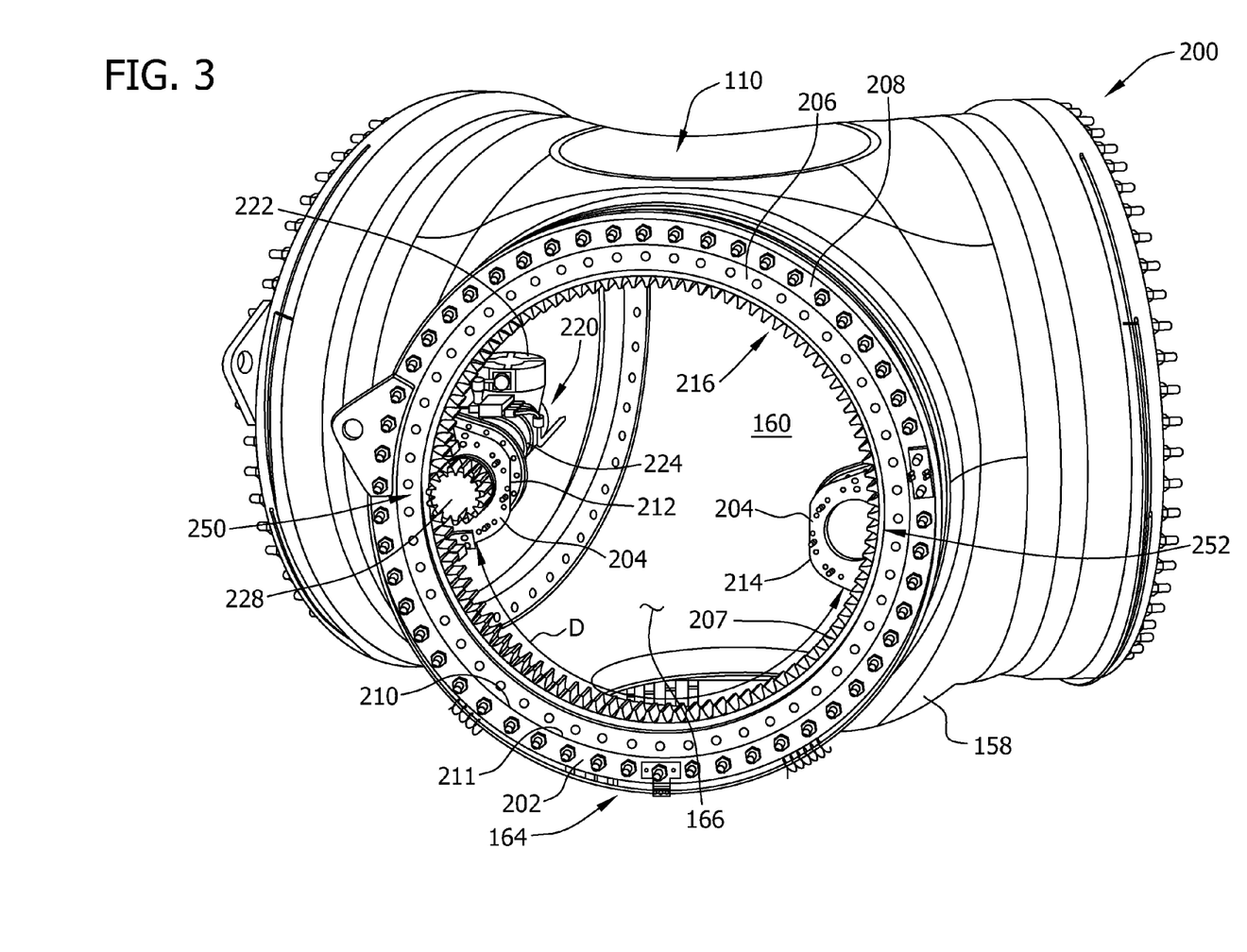
FIG. 3 is a perspective view of an exemplary pitch assembly suitable for use with the wind turbine generator shown in FIG. 1.
Figure 4:
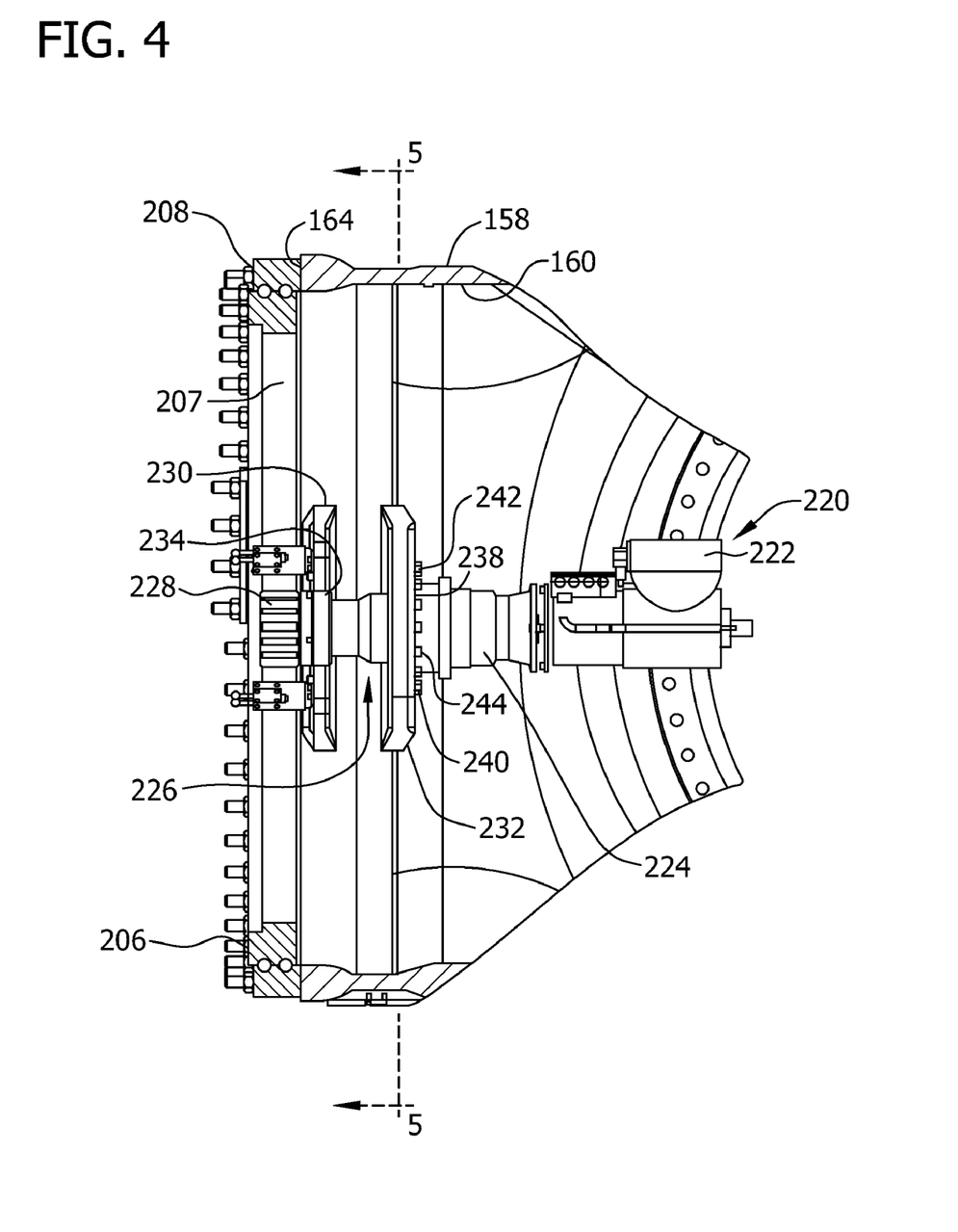
FIG. 4 is an enlarged schematic view of an exemplary pitch gearbox bracket suitable for use with the pitch assembly shown in FIG. 3.
Figure 5:
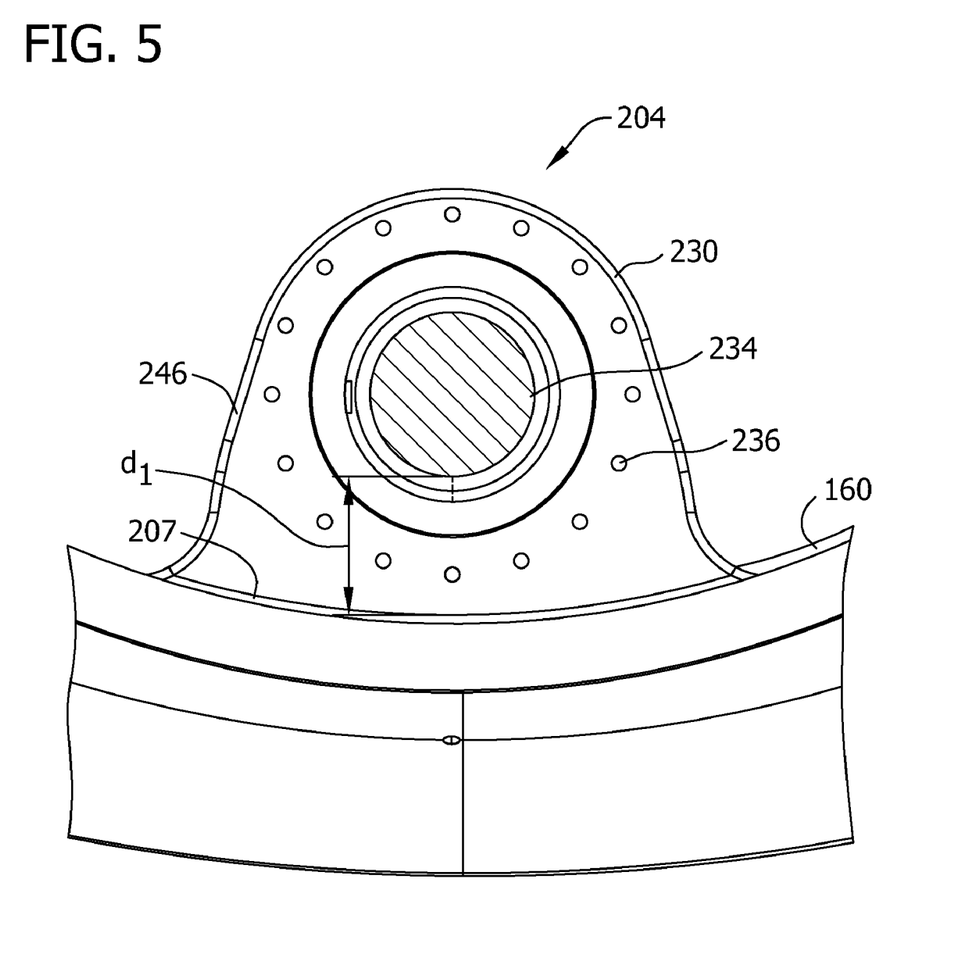
FIG. 5 is an enlarged cross-section view of exemplary pitch gearbox brackets suitable for use with the pitch assembly shown in FIG. 3.

FIG. 3 is a perspective view of a pitch assembly 200 that is suitable for use in wind turbine generator 100. FIG. 4 is an enlarged cross-sectional view of pitch assembly 200. FIG. 5 is an enlarged cross-section view of a plurality of exemplary pitch gearbox brackets 204 (taken along line 5-5). In the exemplary embodiment, pitch assembly 200 includes a pitch bearing 202 and at least two pitch gearbox brackets 204. Pitch bearing 202 is rotatably coupled to hub outer wall 158, such that pitch bearing 202 is rotatable about pitch axis 118.

Pitch bearing 202 includes an inner race 206 positioned radially inward to, and substantially concentric with, an outer race 208. Inner race 206 is rotatably coupled to outer race 208 such that inner race 206 rotates relative to outer race 208 about pitch axis 118. Outer race 208 is securely coupled to hub outer wall 158. More specifically, in the exemplary embodiment, outer race 208 is coupled to hub outer wall 158 using a plurality of fasteners, such as bolts and nuts. Alternatively, outer race 208 is coupled to hub outer wall 158 by methods that include, but are not limited to, retention hardware, welds, and/or sealing methods and apparatus known in the art.

In the exemplary embodiment, outer race 208 is coupled to hub outer wall 158, such that outer race 208 is in substantial contact with bearing surface 164. An annular groove 210 is defined between inner race 206 and outer race 208 and includes at least one material 211 that facilitates reducing friction between inner race 206 and outer race 208. Material 211 is at least one of bearing balls, rollers, or a lubricant.

A plurality of pitch gearbox brackets 204 are positioned within hub cavity 166 and are coupled to hub inner surface 160. In the exemplary embodiment, pitch assembly 200 includes a first pitch gearbox bracket 212 and a second pitch gearbox bracket 214. First pitch gearbox bracket 212 is positioned substantially opposite second pitch gearbox bracket 214 along a circumference 216 of pitch bearing 202. In an alternative embodiment, pitch assembly 200 includes a plurality of pitch gearbox brackets 204 that are equally spaced a circumferential distance D apart from each other about pitch bearing 202. In an alternative embodiment, the plurality of pitch gearbox brackets 204 are spaced at any distance that enables pitch assembly 200 to function as described herein.

In the exemplary embodiment, pitch gearbox brackets 204 are coupled to hub inner surface 160 using a weld, however, pitch gearbox brackets 204 may be coupled to hub inner surface 160 by methods that include, but are not limited to, retention hardware, and sealing methods such that pitch gearbox brackets 204 are securely coupled to hub inner surface 160. In a further embodiment pitch gearbox brackets 204 are formed integral with hub 110. Rotor blade 112 (shown in FIG. 1) is removably coupled to inner race 206 using a plurality of bolts. Alternatively, rotor blade 112 may be coupled to inner race 206 using any methods known in the art that enable rotor blade 112 to be removed from inner race 206.

Pitch assembly 200 also includes a pitch drive system 220 that includes a pitch drive motor 222, a pitch gearbox 224, a pitch drive shaft 226, and a pitch drive pinion 228. Pitch drive motor 222 is coupled to pitch gearbox 224 such that pitch drive motor 222 imparts mechanical force to pitch gearbox 224. Pitch gearbox 224 is coupled to pitch drive shaft 226 and pitch drive shaft 226 is coupled to pitch drive pinion 228, such that pitch drive pinion 228 is rotated by pitch gearbox 224, with pitch drive shaft 226.

Inner race 206 includes a plurality of pitch bearing teeth 207 spaced circumferentially about inner race 206. Pitch bearing teeth 207 engage pitch drive pinion 228 such that the rotation of pitch drive pinion 228 causes rotation of inner race 206 of pitch bearing 202. First pitch gearbox bracket 212 is coupled to pitch drive system 220, such that first pitch gearbox bracket 212 supports pitch drive system 220 and retains pitch drive system 220 in a fixed position relative to pitch bearing 202. More specifically, first pitch gearbox bracket 212 is sized to receive pitch drive system 220 therein.

In the exemplary embodiment first pitch gearbox bracket 212 is substantially similar to second pitch gearbox bracket 214. First pitch gearbox bracket 212 includes a first member 230 and a second member 232. First member 230 is coupled to hub inner surface 160 and extends substantially-radially inward from hub inner surface 160. First member 230 includes a central opening 234 and a plurality of bores 236. Central opening 234 is positioned substantially concentric within first member 230 and extends at least partially therethrough. Central opening 234 is sized and shaped to receive pitch drive shaft 226 and pitch drive pinion 228.

Pitch drive pinion 228 is rotatably coupled to first member 230 and is positioned between first member 230 and pitch bearing 202. Pitch drive pinion 228 is inserted through central opening 234 and is aligned concentric to central opening 234. Central opening 234 is positioned a distance $d_1$ from hub inner surface 160 such that pitch drive pinion 228 contacts pitch bearing teeth 207. Bores 236 are positioned radially outward from central opening 234 and are aligned substantially circumferentially about central opening 234.

Second member 232 is coupled to hub inner surface 160 and extends substantially-radially inward from hub inner surface 160 and is aligned substantially perpendicular to hub inner surface 160. Second member 232 includes a central opening 238 and a plurality of bores 240, and is aligned to first member 230, such that first member central opening 234 is concentrically-aligned with second member central opening 238. Second member 232 is positioned between first member 230 and pitch drive motor 222, such that pitch drive shaft 226 is coupled to first member 230 and second member 232. Central opening 238 is sized and shaped to receive pitch drive shaft 226 and pitch gearbox 224.

Bores 240 are circumferentially positioned about central opening 238. Pitch gearbox 224 includes at least one opening 242 that is sized and shaped to receive at least one bolt 244. Bolt 244 is inserted through opening 242 and into a corresponding bore 240 to securely couple pitch gearbox 224 to second member 232, such that first pitch gearbox bracket 212 facilitates reducing pitch assembly 200 from moving relative to hub 110. In the exemplary embodiment, first member 230 and second member 232 include a bell-shaped flange 246. In an alternative embodiment, first member 230 and second member 232 may have any shape that enables pitch assembly 200 to operate as described herein.

Pitch drive system 220 is coupled to control system 150 (shown in FIG. 2) for adjusting the pitch angle of rotor blade 112 upon receipt of a signal from control system 150. Pitch drive motor 222 includes any suitable structure, configuration, arrangement, means, and/or components, such as, but not limited to, electrical motors, hydraulic cylinders, springs, and/or servo-mechanisms. Moreover, pitch drive motor 222 is driven by any suitable means, such as, but not limited to, hydraulic fluid, electrical power, electro-chemical power, and/or mechanical power, such as, but not limited to, spring force. In some embodiments, pitch drive motor 222 is driven by energy extracted from at least one of a rotational inertia of rotor 108 and a stored energy source (not shown) that supplies energy to components of wind turbine generator 100.

Pitch drive system 220 uses pitch drive motor 222 to change the pitch angle of rotor blades 112 by rotating rotor blades 112 with respect to hub 110 and outer race 208. More specifically, in the exemplary embodiment, pitch drive pinion 228 is coupled to pitch bearing 202 such that rotation of pitch drive system 220 rotates pitch bearing 202 and rotor blade 112 about pitch axis 118 to change the pitch of rotor blade 112. During operation of wind turbine generator 100, pitch drive system 220 rotates each rotor blade 112 a limited distance about pitch axis 118, such that pitch drive pinion 228 contacts a limited number of pitch bearing teeth 207.

In an alternative embodiment, inner race 206 is securely coupled to hub outer wall 158 and is positioned in contact with bearing surface 164. In such an embodiment, outer race 208 is rotatably coupled to inner race 206, such that outer race 208 rotates relative to inner race 206. In this alternative embodiment, pitch gearbox brackets 204 are coupled to hub outer surface 162, such that pitch drive system 220 is positioned outside hub cavity 166 and is coupled to outer race 208. Rotor blade 112 is coupled to outer race 208, such that pitch drive system 220 rotates rotor blade 112 about pitch axis 118.

In the exemplary embodiment, during operation of pitch drive system 220, a first set 250 of pitch bearing teeth 207 that contact pitch drive pinion 228 may become worn and may not be able to translate rotational force from pitch drive system 220 to pitch bearing 202. Therefore, it becomes necessary to relocate pitch drive system 220 within hub 110, such that pitch drive system 220 rotates pitch bearing 202 by a second set 252 of pitch bearing teeth 207 that is different than first set 250. More specifically, pitch drive system 220 is selectively coupled to one of first set 250 and second set 252 of pitch bearing teeth 207, such that pitch drive system 220 contacts a predetermined set of pitch bearing teeth 207. Further, pitch drive system 220 is uncoupled from first pitch gearbox bracket 212, is inserted through second pitch gearbox bracket 214, and is securely coupled to second pitch gearbox bracket 214, wherein pitch drive pinion 228 is realigned adjacent to and in contact with second set 252 such that a new set of pitch bearing teeth 207 is utilized.

The above-described systems and methods facilitate maintaining the pitch assembly without removing a hub and/or rotor blade from a wind turbine. More specifically, the plurality of pitch gear brackets positioned circumferentially about a pitch bearing enable the pitch drive system to be relocated about the pitch bearing, such that the pitch drive pinion is realigned to contact new pitch bearing teeth. The ability to maintain the pitch assembly without removing the hub and/or rotor blade from the wind turbine facilitates reducing the need for lifting cranes required to remove the hub. As such, the cost and manpower required to maintain the pitch assembly in a wind turbine is significantly reduced. Reducing such costs extends the operational life expectancies of wind turbine pitch assemblies.

Exemplary embodiments of systems and methods for assembling a pitch assembly for use in a wind turbine are described above in detail. The systems and methods are not limited to the specific embodiments described herein, but rather, components of systems and/or steps of the methods may be utilized independently and separately from other components and/or steps described herein. For example, the methods may also be used in combination with other wind turbine generators, and are not limited to practice with only the wind turbine generator as described herein. Rather, the exemplary embodiment can be implemented and utilized in connection with many other wind turbine generator applications.

Although specific features of various embodiment of the invention may be shown in some drawings and not in others, this is for convenience only. In accordance with the principles of the invention, any feature of a drawing may be reference and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling a wind turbine, said method comprising:
   coupling a pitch bearing to a hub that includes a wall, the pitch bearing including a plurality of sets of pitch bearing teeth;
   coupling at least one blade to the pitch bearing such that the blade is rotatable about a pitch axis;
   coupling a first pitch gearbox bracket to the hub wall and adjacent a first set of pitch bearing teeth;
   coupling at least a second pitch gearbox bracket to the hub wall, the second pitch gearbox bracket circumferentially-spaced from the first pitch gearbox bracket about the pitch bearing such that the second pitch gearbox is adjacent a second set of pitch bearing teeth that is different than the first set of pitch bearing teeth; and,
   selectively coupling a pitch drive system to one of the first pitch gearbox bracket and the second pitch gearbox bracket, such that the pitch drive system contacts one of the plurality of sets of pitch bearing teeth.

2. A method in accordance with claim 1, further comprising: coupling the first pitch gearbox bracket substantially opposite the second pitch gearbox bracket along a circumference of the pitch bearing.

3. A method in accordance with claim 1, further comprising inserting the pitch drive system through the at least one pitch gearbox bracket, wherein each of the pitch gearbox brackets include a central opening sized to receive the pitch drive system therein.

4. A method in accordance with claim 1, wherein each of the first and second pitch gearbox brackets include a first member and a second member, and wherein the pitch drive system includes a pitch pinion, said method further comprises coupling the pitch pinion to the first member, such that the pitch pinion is positioned adjacent the pitch bearing.

5. A pitch assembly for use in a wind turbine, said pitch assembly comprising:
   a pitch bearing rotatably coupled to a hub, said pitch bearing comprising a plurality of sets of pitch bearing teeth;
   a pitch drive system operatively coupled to said pitch bearing, said pitch drive system configured to contact a predetermined set o pitch bearing teeth;
   a plurality of pitch gearbox brackets coupled to a wall of the hub, each pitch gearbox bracket of said plurality of pitch gearbox brackets configured to orient said pitch drive system with respect to a different set of pitch bearing teeth, said plurality of pitch gearbox brackets comprising:
   a first pitch gearbox bracket positioned adjacent a first set of bearing teeth; and,
   at least a second pitch gearbox bracket circumferentially-spaced from said first pitch gearbox bracket about said pitch bearing such that said second pitch gearbox bracket is positioned adjacent a second set of pitch bearing teeth that is different than the first set of pitch bearing teeth,
   said pitch drive system removably coupled to one of said plurality of pitch gearbox brackets to selectively contact one of the plurality of sets of pitch bearing teeth.

6. A pitch assembly in accordance with claim 5, wherein said first pitch gearbox bracket is positioned substantially opposite said second pitch gearbox bracket along a circumference of said pitch bearing.

7. A pitch assembly in accordance with claim 5, wherein each of said plurality of pitch gearbox brackets is configured to retain said pitch drive system.

8. A pitch assembly in accordance with claim 5, wherein the hub wall includes an inner surface, said plurality of pitch gearbox brackets are coupled to the hub inner surface.

9. A pitch assembly in accordance with claim 5, wherein the hub wall includes an outer surface, said plurality of pitch gearbox brackets are coupled to the hub outer surface.

10. A pitch assembly in accordance with claim 5, wherein each pitch gearbox bracket of said plurality of pitch gearbox brackets comprises a central opening sized to receive said pitch drive system therein, said pitch drive system coupled to at least one of said plurality of pitch gearbox brackets by inserting said pitch drive system through said central opening.

11. A pitch assembly in accordance with claim 5, wherein each pitch gearbox bracket of said plurality of said pitch gearbox brackets comprises a plurality of openings, said pitch drive system coupled to at least one of said plurality of pitch gearbox brackets with at least one bolt inserted through at least one of said plurality of openings.

12. A pitch assembly in accordance with claim 5, wherein each pitch gearbox bracket of said plurality of pitch gearbox brackets comprises:
   a first member comprising a central opening; and
   a second member comprising a central opening, said first member positioned between said pitch bearing and said second member, said second member central opening concentrically aligned with said first member central opening.

13. A pitch assembly in accordance with claim 12, wherein said pitch drive system comprises a pitch pinion coupled to said first member, said first member positioned adjacent said pitch bearing such that said pitch pinion is in contact with said pitch bearing.

14. A wind turbine system, comprising:
   a hub comprising a wall;
   a pitch bearing rotatably coupled to said hub, said pitch bearing comprising a plurality of sets of pitch bearing teeth;
   at least one rotor blade coupled to said pitch bearing;
   a pitch drive system operatively coupled to said pitch bearing, said pitch drive system configured to contact a predetermined set of pitch bearing teeth;
   a plurality of pitch gearbox brackets coupled to said hub wall, each pitch gearbox bracket of said plurality of pitch gearbox brackets configured to orient said pitch drive system with respect to a different set of pitch bearing teeth, said plurality of pitch gearbox brackets comprising:
   a first pitch gearbox bracket positioned adjacent a first set of bearing teeth; and,
   at least a second pitch gearbox bracket circumferentially-spaced from said first pitch gearbox bracket about said pitch bearing such that said second pitch gearbox bracket is positioned adjacent a second set of pitch bearing teeth that is different than the first set of pitch bearing teeth;
   said pitch drive system removably coupled to one of said plurality of pitch gearbox brackets to selectively contact one of the plurality of sets of pitch bearing teeth.

15. A wind turbine system in accordance with claim 14, wherein said first pitch gearbox bracket is positioned substantially opposite said second pitch gearbox bracket along a circumference of said pitch bearing.

16. A wind turbine system in accordance with claim 14, wherein said hub wall comprises an inner surface, said plurality of pitch gearbox brackets are coupled to said inner surface.

17. A wind turbine system in accordance with claim 14, wherein said hub wall comprises an outer surface, said plurality of pitch gearbox brackets are coupled to said outer surface.

18. A wind turbine system in accordance with claim 14, wherein each pitch gearbox bracket of said plurality of pitch gearbox brackets comprises a central opening sized to receive said pitch drive system therein, said pitch drive system coupled to at least one of said pitch gearbox brackets by inserting said pitch drive system through said central opening.

19. A wind turbine system in accordance with claim 14, wherein each pitch gearbox bracket of said plurality of pitch gearbox brackets comprises a plurality of openings, said pitch drive system coupled to at least one of said plurality of pitch gearbox brackets with at least one bolt inserted through at least one of said plurality of openings.

20. A wind turbine system in accordance with claim 14, wherein each pitch gearbox bracket of said plurality of pitch gearbox brackets comprises:
   a first member comprising a central opening; and,
   a second member comprising a central opening, said first member positioned between said pitch bearing and said second member, said second member central opening concentrically aligned with said first member central opening.

* * * * *